(12) United States Patent
Liao et al.

(10) Patent No.: US 10,429,658 B2
(45) Date of Patent: Oct. 1, 2019

(54) ILLUMINATION SYSTEM AND PROJECTION APPARATUS USING THE SAME

(71) Applicant: Coretronic Corporation, Hsin-Chu (TW)

(72) Inventors: Chien-Chung Liao, Hsin-Chu (TW); Jui Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/828,244

(22) Filed: Nov. 30, 2017

(65) Prior Publication Data

US 2018/0157050 A1    Jun. 7, 2018

(30) Foreign Application Priority Data

Dec. 2, 2016  (CN) .......................... 2016 1 1094953

(51) Int. Cl.
  *G03B 21/20* (2006.01)
  *G02B 27/10* (2006.01)
  *G02B 27/28* (2006.01)

(52) U.S. Cl.
  CPC .......... *G02B 27/10* (2013.01); *G02B 27/283* (2013.01); *G03B 21/204* (2013.01); *G03B 21/2066* (2013.01)

(58) Field of Classification Search
  CPC .. G03B 21/204; G03B 21/2066; G02B 27/10; G02B 27/283
  See application file for complete search history.

(56) References Cited

U.S. PATENT DOCUMENTS

| 9,684,181 B2 | 6/2017 | Murota |
| 2013/0083295 A1 | 4/2013 | Miyazaki |
| 2016/0004148 A1* | 1/2016 | Chiu ................. G03B 21/204 353/84 |
| 2017/0089758 A1* | 3/2017 | Okamoto ............ G01J 1/42 |

FOREIGN PATENT DOCUMENTS

| CN | 1543585 A | 11/2004 |
| CN | 102289141 A | 12/2011 |
| CN | 102418907 A | 4/2012 |
| CN | 102563410 A | 7/2012 |

(Continued)

*Primary Examiner* — Ryan D Howard
*Assistant Examiner* — Danell L Owens

(57) ABSTRACT

An illumination system includes a first light source providing a first color beam, a first beam-splitting element which disposes on a transmission path of the first color beam and separates the first color beam into a first sub-beam and a second sub-beam, an optical wavelength conversion element which receives the first sub-beam and converts the first sub-beam into a second color beam and reflects the second color beam back to the first beam-splitting element, a second light source providing a third color beam, and a second beam-splitting element which is located between the second light source and the first beam-splitting element to reflect the second sub-beam. The third color beam passes through the second beam-splitting element and is transmitted to the first beam-splitting element. The second sub-beam, the second color beam and the third color beam are combined into an illumination beam.

19 Claims, 8 Drawing Sheets

(56) References Cited

FOREIGN PATENT DOCUMENTS

| | | | |
|---|---|---|---|
| CN | 103453448 | A | 12/2013 |
| CN | 103189794 | B | 7/2015 |
| CN | 104808426 | A | 7/2015 |
| CN | 103324014 | B | 11/2015 |
| CN | 106444253 | A | 2/2017 |
| EP | 2270589 | A1 | 1/2011 |
| WO | 2017129710 | A1 | 8/2017 |

* cited by examiner

ILLUMINATION SYSTEM AND PROJECTION APPARATUS USING THE SAME

CROSS-REFERENCE TO RELATED APPLICATION

This application claims the priority benefit of CN201611094953.4 filed on 2016 Dec. 2. The entirety of the above-mentioned patent application is hereby incorporated by reference herein and made a part of this specification.

FIELD OF THE INVENTION

The invention relates to a light source module, and more particularly to an illumination system and a projection apparatus using the same.

BACKGROUND OF THE INVENTION

The share of laser projection apparatus adopting laser source in the market of high-end projection apparatus is getting higher and higher. In general, one of the high-end projection apparatuses is referred to a projection apparatus with three light valves, and therefore, it is necessary to provide three continuous color beams (red, green, blue) to the three light valves respectively.

A known laser projection apparatus with three light valves generally includes two sets of blue laser sources. One of the two sets of blue laser sources provides a blue light on the phosphor so as to excite the phosphor to generate a yellow light. By a complicated optical path design, the yellow light is combined with another blue light continuously provided by another set of blue laser sources. Then, the combined yellow and blue lights are separated into a red light, a green light and a blue light by a plurality of beam-splitting elements, which are then transmitted to the three light valves respectively.

However, due to the known laser projection apparatus with three light valves requires two sets of blue laser sources, so the cost is high. In addition, due to the optical path design is complicated, so the volume is large.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illumination system to reduce the cost of the illumination system.

The invention provides a projection apparatus including three light valves to reduce the cost of the projection apparatus.

The invention provides a projection apparatus including one light valve to reduce the cost of the projection apparatus.

Other objectives and advantages of the invention will become apparent from the technical features disclosed in the invention.

In order to achieve one or some or all of the above objects or other objects, an embodiment of the invention provides an illumination system, which includes a first light source, a first beam-splitting element, an optical wavelength conversion element, a second beam-splitting element and a second light source. The first light source is a laser source and adapted to provide a first color beam. The first beam-splitting element is disposed on a transmission path of the first color beam and used to separate the first color beam into a first sub-beam and a second sub-beam. The optical wavelength converting element is disposed on a transmission path of the first sub-beam, and the optical wavelength converting element is used to convert the first sub-beam into a second color beam and reflect the second color beam back to the first beam-splitting element. The second light source is adapted to provide a third color beam. The second beam-splitting element is disposed on a transmission path of the second sub-beam and located between the second light source and the first beam-splitting element. The second sub-beam is reflected back to the first beam-splitting element by the second beam-splitting element. The third color beam passes through the second beam-splitting element and is transmitted to the first beam-splitting element. The second sub-beam, the second color beam and the third color beam are combined into an illumination beam by the first beam-splitting element.

In order to achieve one or some or all of the above objects or other objects, an embodiment of the invention provides a projection apparatus, which includes the illumination system of the above-described embodiment, a beam-splitting and combiner system, a first light valve, a second light valve, a third light valve and a projection lens. The beam-splitting and combiner system is disposed on a transmission path of the illumination beam provided by the illumination system and used to separate the illumination beam into a fourth color beam, a fifth color beam and a sixth color beam. The first light valve is disposed on a transmission path of the fourth color beam and used to convert the fourth color beam into a first sub-image beam. The second light valve is disposed on a transmission path of the fifth color beam and used to convert the fifth color beam into a second sub-image beam. The third light valve is disposed on a transmission path of the sixth color beam and used to convert the sixth color beam into a third sub-image beam. The first sub-image beam, the second sub-image beam and the third sub-image beam are combined into an image beam by the beam-splitting and combiner system. The projection lens is disposed on a transmission path of the combined image beam and is used to project the combined image beam.

In order to achieve one or some or all of the above objects or other objects, an embodiment of the invention provides another projection apparatus, which includes the illumination system of the above-described embodiment, a light valve and a projection lens. The light valve is disposed on a transmission path of the illumination beam provided by the illumination system and used to convert the illumination beam into an image beam. The projection lens is disposed on a transmission path of the image beam and is used to project the image beam.

The illumination system according to the embodiment of the invention separates a first color beam provided by a first light source (laser source) into a first sub-beam and a second sub-beam by a first beam-splitting element. The first sub-beam is converted into a second color beam by an optical wavelength converting element, and the optical wavelength converting element reflects the second color beam. The second color beam is combined with the second sub-beam, therefore, only a set of blue laser sources is needed to generate the first color beam and the second color beam transmitted to the light valve. Compared with the prior art, the illumination system of the embodiment of the invention can reduce the cost and volume by reducing the total number of laser sources. In addition, a second beam-splitting element may include a moving member, which may rotate or vibrate to improve speckles. In addition, since the projection apparatus of the embodiment of the invention adopts the illumination system, the problem of having complicated light transmission path and high cost in the projection apparatus adopting two sets of blue laser sources in prior art is improved, and the volume thereof can be reduced. In addition, since the first light source (blue laser source) and the second light source (red laser source) share the second beam-splitting element, the volume of the illumination system is reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
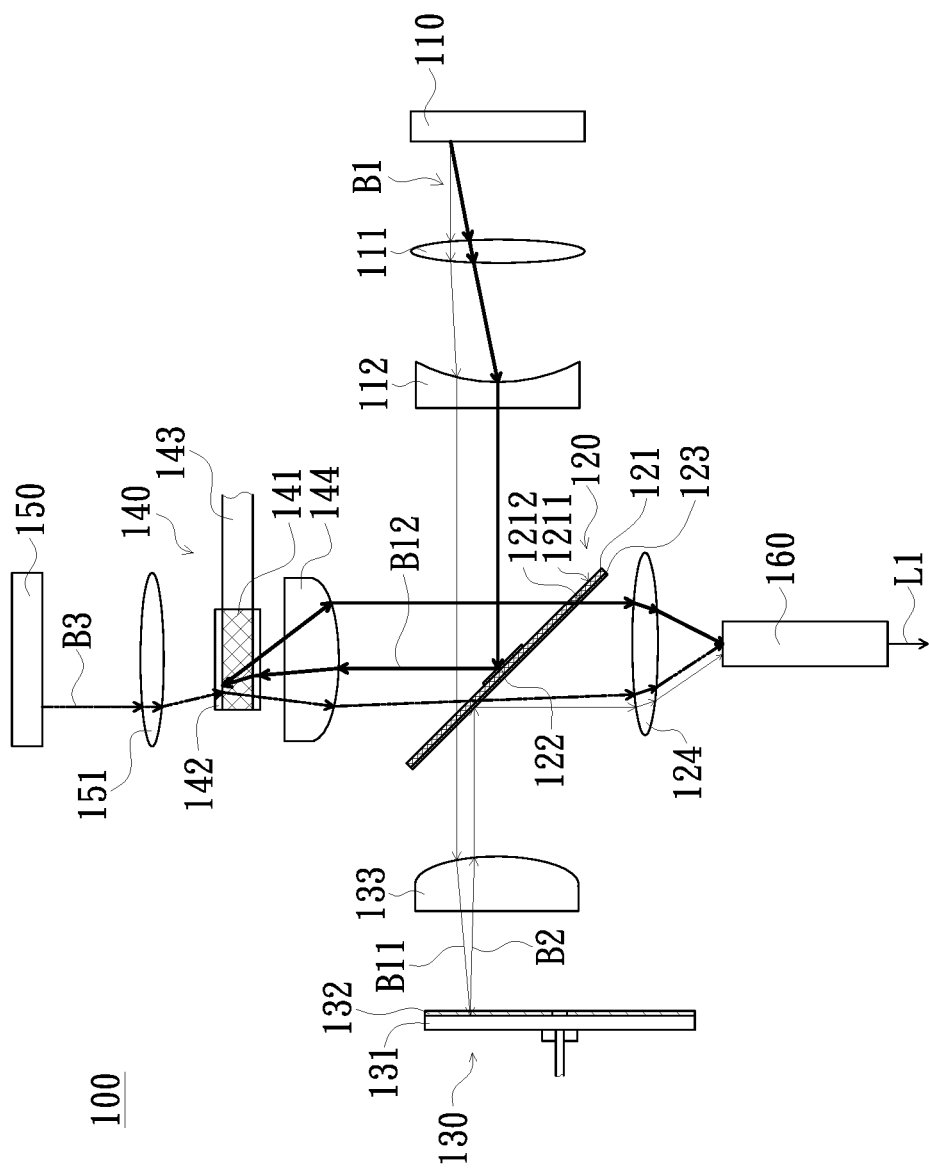
FIG. 1 is a schematic view of an illumination system in accordance with an embodiment of the invention.

FIG. 1 is a schematic view of an illumination system in accordance with an embodiment of the invention. As shown in FIG. 1, an embodiment of the invention provides an illumination system 100, which includes a first light source 110, a first beam-splitting element 120, an optical wavelength conversion element 130, a second beam-splitting element 140 and a second light source 150. The first light source 110 is a laser light source and is adapted to provide a first color beam B1. The first beam-splitting element 120 is disposed on the transmission path of the first color beam B1 and is used to divide the first color beam B1 into a first sub-beam B11 and a second sub-beam B12. The first beam-splitting element 120 is located between the first light source 110 and the optical wavelength conversion element 130. The optical wavelength conversion element 130 is disposed on the transmission path of the first sub-beam B11 and is used to convert the first sub-beam B11 into a second color beam B2 and reflect the second color beam B2 back to the first beam-splitting element 120. The second beam-splitting element 140 is disposed on the transmission path of the second sub-beam B12 and is located between the second light source 150 and the first beam-splitting element 120. The second sub-beam B12 is reflected back to the first beam-splitting element 120 by the second beam-splitting element 140. The second light source 150 is adapted to provide a third color beam B3. The third color beam B3 passes through the second beam-splitting element 140 and is transmitted to the first beam-splitting element 120. The first beam-splitting element 120 is used to combine the second sub-beam B12, the second color beam B2 and the third color beam B3 into an illumination beam L1.

In the embodiment, the first light source 110 includes, for example, a plurality of laser diodes (not shown). These laser diodes are arranged as, for example, an array. In the embodiment, the first color light source 110 may be, for example, a blue laser light source. The second light source 150 may include a light emitting diode, a laser diode, or other suitable light emitting element, and the total number of light emitting elements may be one or more than one. The light emitting diode may be a light emitting device having a phosphor layer and well packaged or a single light emitting diode chip. In the embodiment, the second light source 150 may be, for example, a red laser light source. In addition, the first light source 110 and the optical wavelength conversion element 130 are, for example, disposed at two opposite sides of the first beam-splitting element 120, but the invention is not limited thereto. A portion of the first color beam B1 passes through, for example, the first beam-splitting element 120 to form the first sub-beam B11 which is transmitted to the optical wavelength conversion element 130. The other portion of the first color beam B1 is, for example, reflected by the first beam-splitting element 120 to form the second sub-beam B12 which is transmitted to the second beam-splitting element 140. The portion of the second sub-beam B12 reflected back to the first beam-splitting element 120 by the second beam-splitting element 140 passes through the first beam-splitting element 120. The third color beam B3 passes through, for example, the first beam-splitting element 120. The second color beam B2 from the optical wavelength conversion element 130 is reflected by the first beam-splitting element 120. The second color beam B2 reflected by the first beam-splitting element 120, the third beam B3 passing through the first beam-splitting element 120 and the portion of the second sub-beam B12 passing through the first beam-splitting element 120 are combined into the illumination beam L1.

Referring to FIG. 1. The first beam-splitting element 120 of the embodiment includes, for example, a substrate 121, a first beam-splitting layer 122 and a second beam-splitting layer 123. The substrate 121 is, for example, a light-permeable substrate. The first beam-splitting layer 122 and the second beam-splitting layer 123 are disposed on the substrate 121. The first beam-splitting layer 122 is, for example, rectangular-shaped and is disposed at the central position of the substrate 121, and a coverage area of the first beam-splitting layer 122 on the substrate 121 is smaller than that of the second beam-splitting layer 123 on the substrate 121. The coverage area of the first beam-splitting layer 122 is the rectangular area. Specifically, the substrate 121 has, for example, a first surface 1211 and a second surface 1211 opposite to each other. The first surface 1211 faces the first light source 110. The first beam-splitting layer 122 is, for example, disposed on the first surface 1211, and the second beam-splitting layer 123 is, for example, disposed on the second surface 1212. The second beam-splitting layer 123 may, for example, cover the entire second surface 1212 and the first beam-splitting layer 122 covers a portion of the first surface 1211. In another embodiment, the first beam-splitting layer 122 and the second first beam-splitting layer 123 may be locally formed on the same surface (e.g., the first surface 1211 or the second surface 1212); that is, the second first beam-splitting layer 123 is disposed around the first beam-splitting layer 122, and the first beam-splitting layer 122 and the second beam-splitting layer 123 are, for example, formed on the substrate 121 in a partition-coating manner.

Figure 2A:
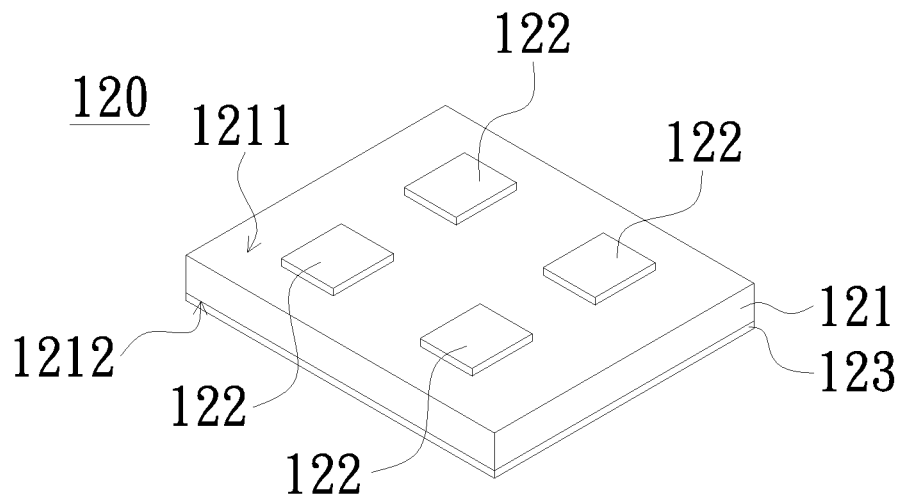
FIG. 2A is a schematic view of a first beam-splitting element of an illumination system in accordance with another embodiment of the invention.
Figure 2B:
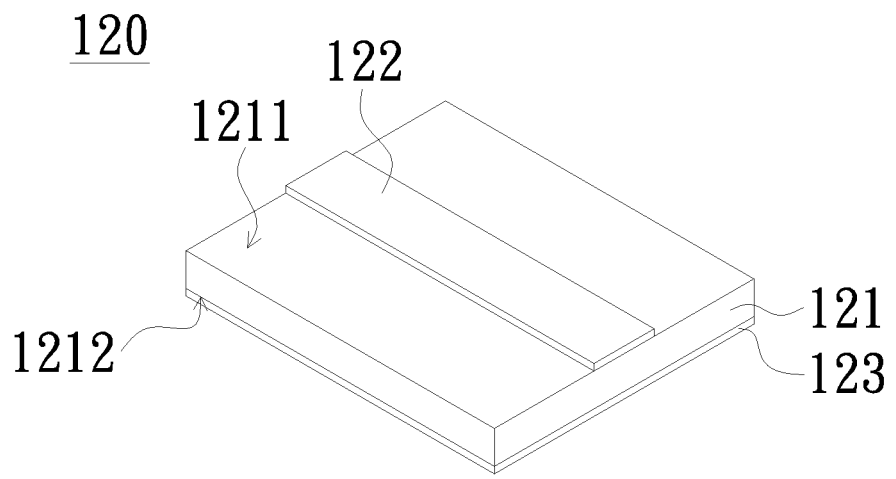
FIG. 2B is a schematic view of a first beam-splitting element of an illumination system in accordance with another embodiment of the invention.

The first beam-splitting layer 122 is used to reflect a portion of the first color beam B1 to form the second sub-beam B12 and allow the third color beam B3 to pass therethrough. The second beam-splitting layer 123 is used to allow the other portion of the first color beam B1 (the first color beam B1 not transmitted to the first beam-splitting layer 122) to pass therethrough thereby form the first sub-beam B11, reflect the second color beam B2, and allow the second sub-beam B12 and the third color beam B3 from the second beam-splitting element 140 to pass therethrough. In an embodiment, the ratio of the coverage area of the first beam-splitting layer 122 on the substrate 121 to the coverage area of the second beam-splitting layer 123 on the substrate 121 is, for example, in the range of 5% to 20%, but the invention is not limited to the above values range. In addition, as long as the condition that the ratio of the coverage area of the first beam-splitting layer 122 on the substrate 121 to the coverage area of the second beam-splitting layer 123 on the substrate 121 is, for example, in the range of 5% to 20% is satisfied, the first beam-splitting layer 122 of the first beam-splitting element 120 of the embodiment may be one rectangular-shaped layer and is disposed at the central position as shown in FIG. 1. In other embodiments, the first beam-splitting layer 122 may be a plurality of rectangular-shaped layers and are distributed on the substrate 121 as shown in FIG. 2A or be a stripe-shaped layer as shown in FIG. 2B; the invention does not limit the shape of the first beam-splitting layer 122.

Please continue to refer to FIG. 1. The optical wavelength conversion element 130 of the embodiment is, for example, a phosphor color wheel. Specifically, the optical wavelength conversion element 130 includes, for example, a rotating member 131 and a phosphor layer 132 disposed on the rotating member 131. The phosphor layer 132 is, for example, annularly disposed on the rotating member 131. When the first sub-beam B11 from the first beam-splitting element 120 irradiates the phosphor layer 132 on the rotating member 131, the first sub-beam B11 can excite the phosphor in the phosphor layer 132 and the first sub-beam B11 is converted into the second color beam B2 by the phosphor layer 132. The phosphor may be a phosphor which generates a yellow light or a phosphor which generates a green light, but the invention is not limited thereto. In addition, with the rotation of the rotating member 131 of the optical wavelength conversion element 130, the first sub-beam B11 can irradiate different regions of the phosphor layer 132, so that the phosphor layer 132 is prevented from being damaged by overheating.

In an embodiment, the second beam-splitting element 140 includes, for example, a diffusion layer 141 and a third beam-splitting layer 142. The diffusion layer 141 is disposed between the third beam-splitting layer 142 and the first beam-splitting element 120; that is, the third beam-splitting layer 142 is located between the second light source 150 and the diffusion layer 141. The third beam-splitting layer 142 allows the third color beam B3 to pass therethrough and reflects the second sub-beam B12. The second sub-beam B12 passes through the diffusion layer 141 of the second beam-splitting element 140 and is then reflected by the third beam-splitting layer 142. The reflected second sub-beam B12 passes through the diffusion layer 141 again and be transmitted back to the first beam-splitting element 120. A portion of the second sub-beam B12 passes through the second beam-splitting layer 123 of the first beam-splitting element 120. The third color beam B3 emitted from the second light source 150 sequentially passes through the third beam-splitting layer 142 and the diffusion layer 141 to be transmitted to the first beam-splitting element 120 and passes through the first beam-splitting element 120. The diffusion layer 141 is, for example, a misty structure, a granular structure or other structure that allows a beam to pass therethrough and diffuse the beam. The second beam-splitting element 140 of the embodiment further includes, for example, a moving member 143. The diffusion layer 141 is annularly connected to the moving member 143. The third beam-splitting layer 142 is disposed on the surface of the diffusion layer 141 facing toward the second light source 150 and corresponds to the position of the diffusion layer 141. The second beam-splitting element 140 of another embodiment includes, for example, a light-permeable moving member 143. The diffusion layer 141 is annularly disposed on the surface of the moving member 143 facing toward the first beam-splitting element 120. The third beam-splitting layer 142 is disposed on the surface of the moving member 143 facing toward the second light source 150 and corresponds to the position of the diffusion layer 141. In addition, the moving member 143 is adapted to rotate and/or vibrate such as a disc, so that the second sub-beam B12 or the third color beam B3 irradiated on the second beam-splitting element 140 can be continuously diffused to prevent the creation of the speckles on the image of the projection apparatus.

In an embodiment, the first color beam B1, the first sub-beam B11 and the second sub-beam B12 are, for example, a blue light; the second color beam B2 is, for example, a yellow or green light; and the third color beam B3 is, for example, a red light. In the embodiment, the first color beam B1 is, for example, a blue light having a peak wavelength of about 455 nm, and the third color beam B3 is, for example, a red light having a peak wavelength of about 638 nm. The first beam-splitting layer 122 of the first beam-splitting element 120 may, for example, reflect a beam having a wavelength of less than 630 nm and allow a beam having a wavelength of greater than 630 nm to pass therethrough. The second beam-splitting layer 123 may, for example, reflect a beam having a wavelength range between 470 nm and 630 nm and allow a beam having a wavelength less than 480 nm or greater than 630 nm to pass therethrough. However, the beam-splitting layer of the invention is not limited to the above numerical range; that is, the wavelength range of penetration and reflection can be adjusted according to the actually adopted color light. In addition, the illumination system 100 of the embodiment further includes a light integration rod 160. The light integration rod 160 is disposed on the transmission path of the illumination beam L1 and is used to receive the illumination beam L1 and homogenize the illumination beam L1. The illumination system 100 may further include other optical elements such as lenses 111, 112 disposed between the first light source 110 and the first beam-splitting element 120, a lens 124 disposed between the first beam-splitting element 120 and the light integration rod 160, a lens 133 disposed between the first beam-splitting element 120 and the optical wavelength conversion element 130, a lens 144 disposed between the second beam-splitting element 140 and the first beam-splitting element 120, and a lens 151 disposed between the second beam-splitting element 140 and the second light source 150.

In the embodiment, the first sub-beam B11 of the first color beam B1 provided by the first light source 110 is used to excite the phosphor of the optical wavelength conversion element 130 thereby being converted into the second color beam B2, which is then combined with the second sub-beam B12 of the first color beam B1. In an embodiment that the first color beam B1 is a blue light and the second color beam B2 is a yellow light, the second color beam B2 and the second sub-beam B12 can be combined into a white light. Compared with the prior art that requires two sets of blue laser light sources, the embodiment requires only a set of blue laser light sources (the first light source 110), so that the cost of illumination system can be reduced. In addition, because the first light source 110 and the second light source 150 share the second beam-splitting element 140, the volume of the illumination system 100 is reduced. In an embodiment that the first color beam B1 is a blue light and the second color beam B2 is a green light. The red light provided by the second light source 150 (the third color beam B3), the second sub-beam B12 and the second color beam B2 are combined into a white light.

Figure 3:
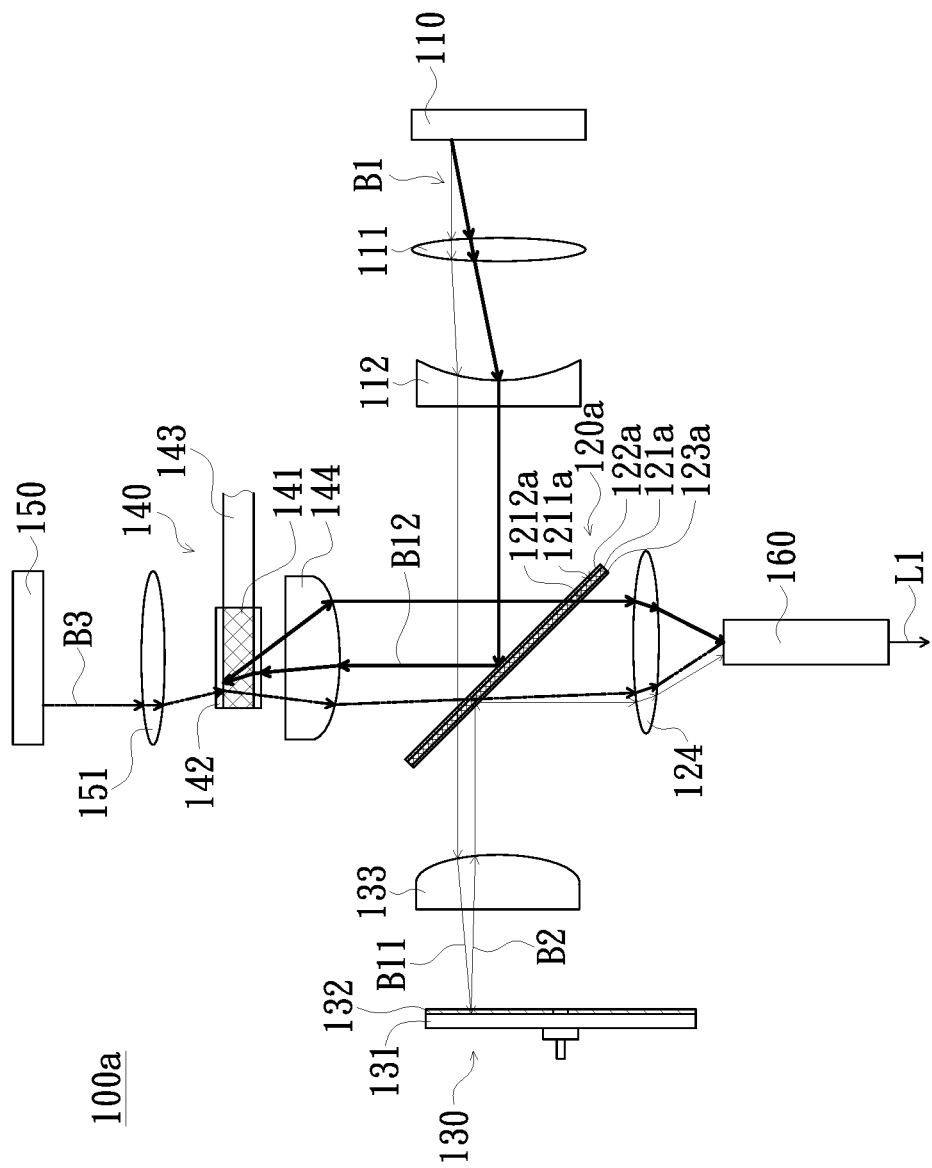
FIG. 3 is a schematic view of an illumination system in accordance with another embodiment of the invention.

FIG. 3 is a schematic view of an illumination system in accordance with another embodiment of the invention. As shown in FIG. 3, the illumination system 100a of the embodiment is similar to the illumination system 100 of the above-described embodiment, except that the first beam-splitting element. Specifically, the first beam-splitting element 120a of the embodiment includes a substrate 121a, a first beam-splitting layer 122a and a second beam-splitting layer 123a. The substrate 121a is, for example, a light-permeable substrate. The first beam-splitting layer 122a is disposed on a first surface 1211a of the substrate 121a and is located between the substrate 121a and the first color light source 110. The first beam-splitting layer 122a is used to reflect a portion of the first color beam B1 to form the second sub-beam B12 and allow the other portion of the first color beam B1 to pass therethrough to form the first sub-beam B11. The second beam-splitting layer 123a is disposed on a second surface 1212a of the substrate 121a and is used to allow the first sub-beam B11 and the third color beam B3 to pass therethrough and reflect the second color beam B2. The first beam-splitting layer 122a may cover the entire first surface 1211a, and the second beam-splitting layer 123a may cover the entire second surface 1212a. In the embodiment, the reflectance and transmittance of the first beam-splitting layer 122a of the first beam-splitting element 120a to the first color beam B1 are, for example, X % and Y % respectively, wherein X is, for example, smaller than Y and X+Y is smaller than or equal to 100. In an embodiment, X is, for example, 10-30 and Y is, for example, 90-70. In addition, in the embodiment, the first color beam B1 is, for example, a blue light having a peak wavelength of about 455 nm, and the third color beam B3 is, for example, a red light having a peak wavelength of about 638 nm. The first beam-splitting layer 122a allows a beam having a wavelength greater than 630 nm to pass therethrough. The second beam-splitting layer 123a reflects a beam having a wavelength range between 470 nm and 630 nm and allows a beam having a wavelength of less than 470 nm or greater than 630 nm to pass therethrough. However, the beam-splitting layer of the invention is not limited to the above numerical range; that is, the wavelength range of penetration and reflection can be adjusted according to the actually adopted color light. In detail, the first sub-beam B11 from the first beam-splitting element 120a is converted into the second color beam B2 by the optical wavelength conversion element 130 and the second color beam B2 is transmitted back to the first beam-splitting element 120a and then is reflected by the second beam-splitting layer 123a; the second sub-beam B12 from the first beam-splitting element 120a is reflected back to the first beam-splitting layer 122a by the third beam-splitting layer 142 of the second beam-splitting element 140; and a portion of the second sub-beam B12 is reflected by the first beam-splitting layer 122a and the other portion sequentially passes through the first beam-splitting layer 122a and the second beam-splitting layer 123a. In addition, the transmission paths of the first color beam B1, the second color beam B2 and the third color beam B3 of the embodiment are similar to those of the embodiment of FIG. 1, and no redundant detail is to be given herein.

Figure 4:
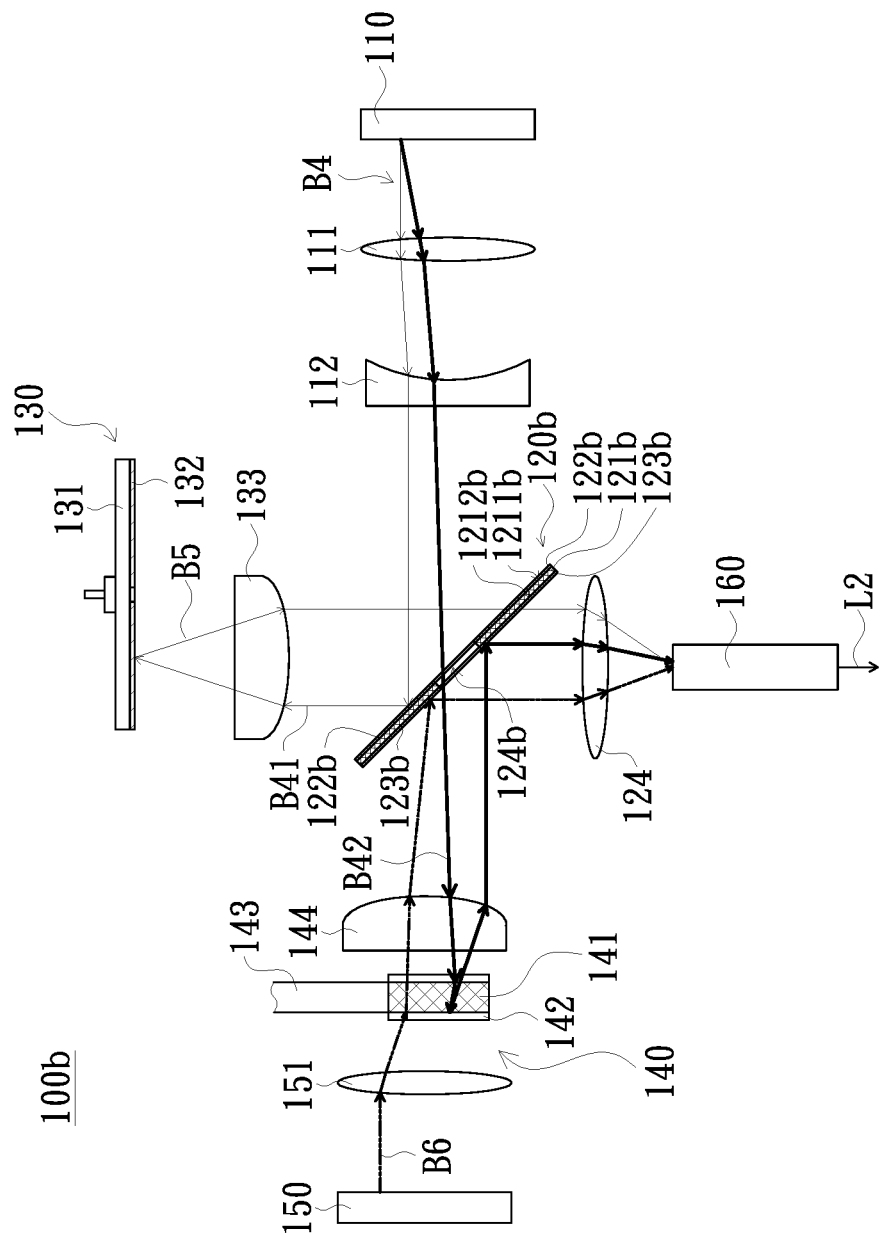
FIG. 4 is a schematic view of an illumination system in accordance with another embodiment of the invention.

FIG. 4 is a schematic view of an illumination system in accordance with another embodiment of the invention. As shown in FIG. 4, the illumination system 100b of the embodiment of the invention is similar to the illumination system 100 of FIG. 1, except that the positions of the optical wavelength conversion element 130, the second light source 150 and the second beam-splitting element 140. The second beam-splitting element 140 and the second light source 150 are disposed at one side of the first beam-splitting element 120b and the first light source 110 is disposed at the opposite side of first beam-splitting element 120b, and correspondingly the penetration and reflection function of the first beam-splitting layer 122b and the second beam-splitting layer 123b need to be adjusted.

The first beam-splitting element 120b of the embodiment is similar to the first beam-splitting element 120 in FIG. 1 and includes a substrate 121b, a first beam-splitting layer 122b and a second beam-splitting layer 123b. The substrate 121b is, for example, a light-permeable substrate. The first beam-splitting layer 122b is disposed on a first surface 1211b of the substrate 121b. The second beam-splitting layer 123b is disposed on a second surface 1212b of the substrate 121b. The main difference is: the substrate 121b of the first beam-splitting element 120b is provided with a through-hole 124b, and the first beam-splitting layer 122b and the second beam-splitting layer 123b do not cover the through-hole 124b. The first beam-splitting layer 122b is used to reflect a portion of the first color beam B4 to form a first sub-beam B41 which is transmitted to the optical wavelength conversion element 130 and allow a second color beam B5 to pass therethrough. The other portion of the first color beam B4 can directly pass through the through-hole 124b to form a second sub-beam B42 which is transmitted to the second beam-splitting element 140. The second beam-splitting layer 123b is used to reflect a third color beam B6, allow the second color beam B5 to pass therethrough and reflect the second sub-beam B42 reflected by the second beam-splitting element 140. The area of the through-hole 124b on the substrate 121b is, for example, smaller than the coverage area of the first beam-splitting layer 121b or the second beam-splitting layer 123b on the substrate 121b. For example, the area of the through-hole 124b on the substrate 121b is 5% to 20% of the coverage area of the first beam-splitting layer 121b or the second beam-splitting layer 123b on the substrate 121b.

The transmission paths of the first color beam B4 (the first sub-beam B41, the second sub-beam B42) and the third color beam B6 of the embodiment are exemplified as follow. The first sub-beam B41 reflected by the first beam-splitting layer 122b is transmitted to the optical wavelength conversion element 130 and converted into the second color beam B5. The second color beam B5 is reflected back to the first beam-splitting element 120b by the optical wavelength conversion element 130 and sequentially passes through the first beam-splitting layer 122b and the second beam-splitting layer 123b. On the other hand, the second sub-beam B42 passing through the through-hole 124b of the first beam-splitting element 120b is transmitted to the second beam-splitting element 140, reflected back to the first beam-splitting element 120b by the third beam-splitting layer 142 of the second beam-splitting element 140, and reflected by the second beam-splitting layer 123b of the first beam-splitting element 120b. The third color beam B6 from the second light source 150 is reflected by the first beam-splitting layer 122b. The second color beam B5 passes through the second beam-splitting layer 123b, the third color beam B6 reflected by the second beam-splitting layer 123b and the second sub-beam B42 are combined into an illumination beam L2. In the embodiment, the first color beam B4 is, for example, a blue light having a peak wavelength of about 455 nm, and the third color beam B6 is, for example, a red light having a peak wavelength of about 638 nm. The first beam-splitting layer 122b of the first beam-splitting element 120b may, for example, reflect a beam having a wavelength of less than 470 nm and allow a beam having a wavelength greater than 470 nm to pass therethrough. The second beam-splitting layer 123b may, for example, reflect a beam having a wavelength of less than 470 or greater than 630 nm and allow a beam having a wavelength range between 470 nm and 630 nm to pass therethrough. However, the beam-splitting layer of the invention is not limited to the above numerical range; that is, the wavelength range of penetration and reflection can be adjusted according to the actually adopted color light. In another embodiment, the substrate 121b may not be provided with a through-hole; instead the first surface 1211b of the substrate 121b is provided with a first pass-through region (not shown). That is, the first beam-splitting layer 122b does not cover the first pass-through region. The second surface 1212b is provided with a second pass-through region (not shown) corresponding to the first pass-through region. That is, the second beam-splitting layer 123b does not cover the second pass-through region. Therefore, a portion of the first color beam B4 can sequentially pass through the first pass-through region and the second pass-through region to form the second sub-beam B42 which is transmitted to the second beam-splitting element 140.

Figure 5:
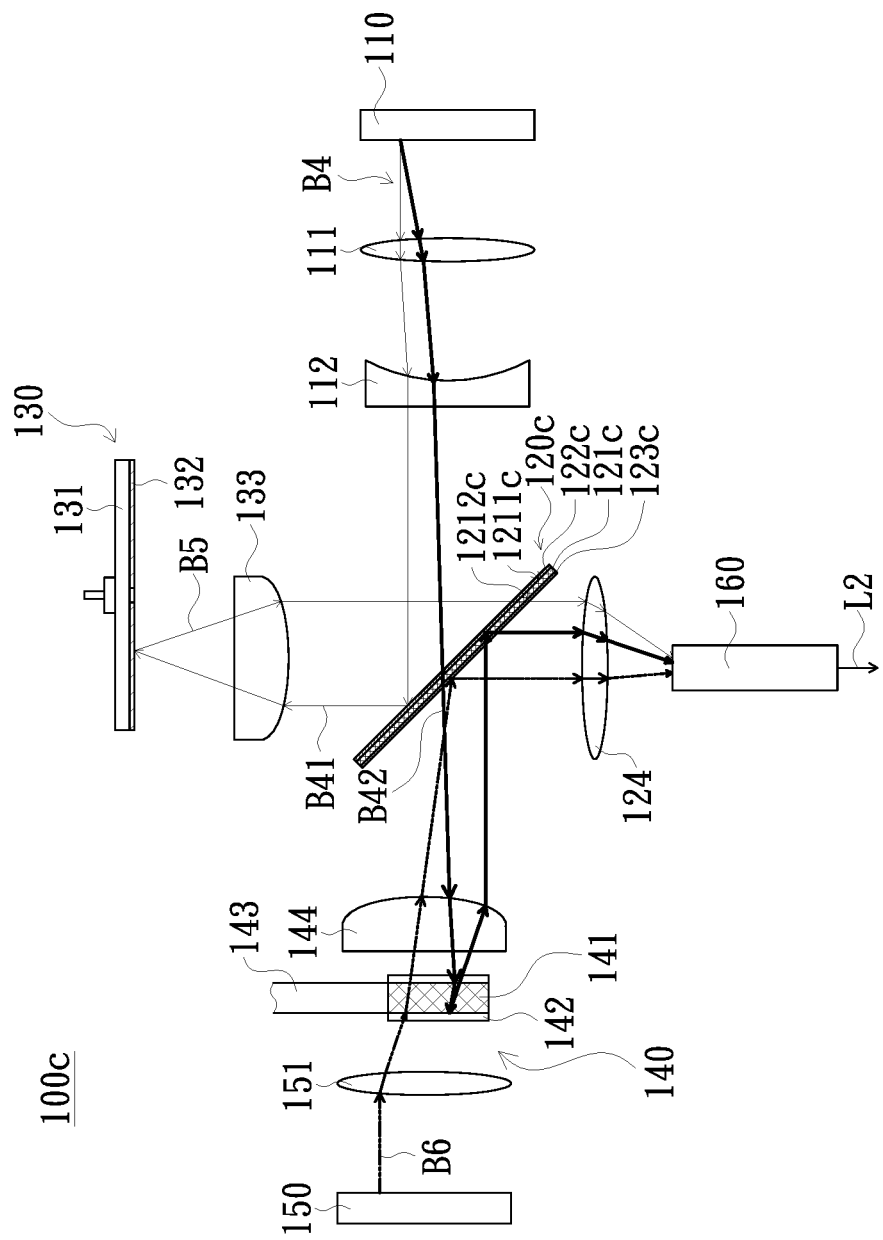
FIG. 5 is a schematic view of an illumination system in accordance with another embodiment of the invention.

FIG. 5 is a schematic view of an illumination system in accordance with another embodiment of the invention. As shown in FIG. 5, the illumination system 100c of the embodiment is similar to the illumination system 100b of FIG. 4, except the structure of the first beam-splitting element. Specifically, the first beam-splitting element 120c of the embodiment includes, for example, a substrate 121c, a first beam-splitting layer 122c and a second beam-splitting layer 123c. The substrate 121c is, for example, a light-permeable substrate. The first beam-splitting layer 122c is disposed on a first surface 1211c of the substrate 121c and is located between the substrate 121c and the first light source 110. The first beam-splitting layer 122c is used to allow the second color beam B5 to pass therethrough, reflect a portion of the first color beam B4 to form the first sub-beam B41, and allow the other portion of the first color beam B4 to pass therethrough to form the second sub-beam B42. The second beam-splitting layer 123c is disposed on a second surface 1212c of the substrate 121c and is used to allow the second sub-beam B42 and the second color beam B5 to pass therethrough and reflect the third color beam B6. The first beam-splitting layer 122c may cover the entire first surface 1211c. The second beam-splitting layer 123c may cover the entire second surface 1212c. The reflectance and transmittance of the first beam-splitting layer 122c to the first color beam B4 are X % and Y % respectively, wherein X+Y is slightly smaller than or equal to 100. For example, X is, for example, 90-70 and Y is, for example, 10-30. The reflectance and transmittance of the first beam-splitting layer 122c of the embodiment to the first color beam B4 are, for example, 75% and 25% respectively. In addition, in the embodiment, the first color beam B4 is, for example, a blue light having a peak wavelength of about 455 nm, and the third color beam B6 is, for example, a red light having a peak wavelength of about 638 nm. The first beam-splitting layer 122c allows a beam having a wavelength range between 470 nm and 630 nm to pass therethrough. The second beam-splitting layer 123c allows, for example, a beam having a wavelength of less than 630 nm to pass therethrough and reflects a beam having a wavelength of greater than 630 nm. However, the beam-splitting layer of the invention is not limited to the above numerical range; that is, the wavelength range of penetration and reflection can be adjusted according to the actually adopted color light. In addition, the transmission paths of the first color beam B4, the second color beam B5 and the third color beam B6 of the embodiment are similar to those of the embodiment shown in FIG. 4, and no redundant detail is to be given herein.

Figure 6:
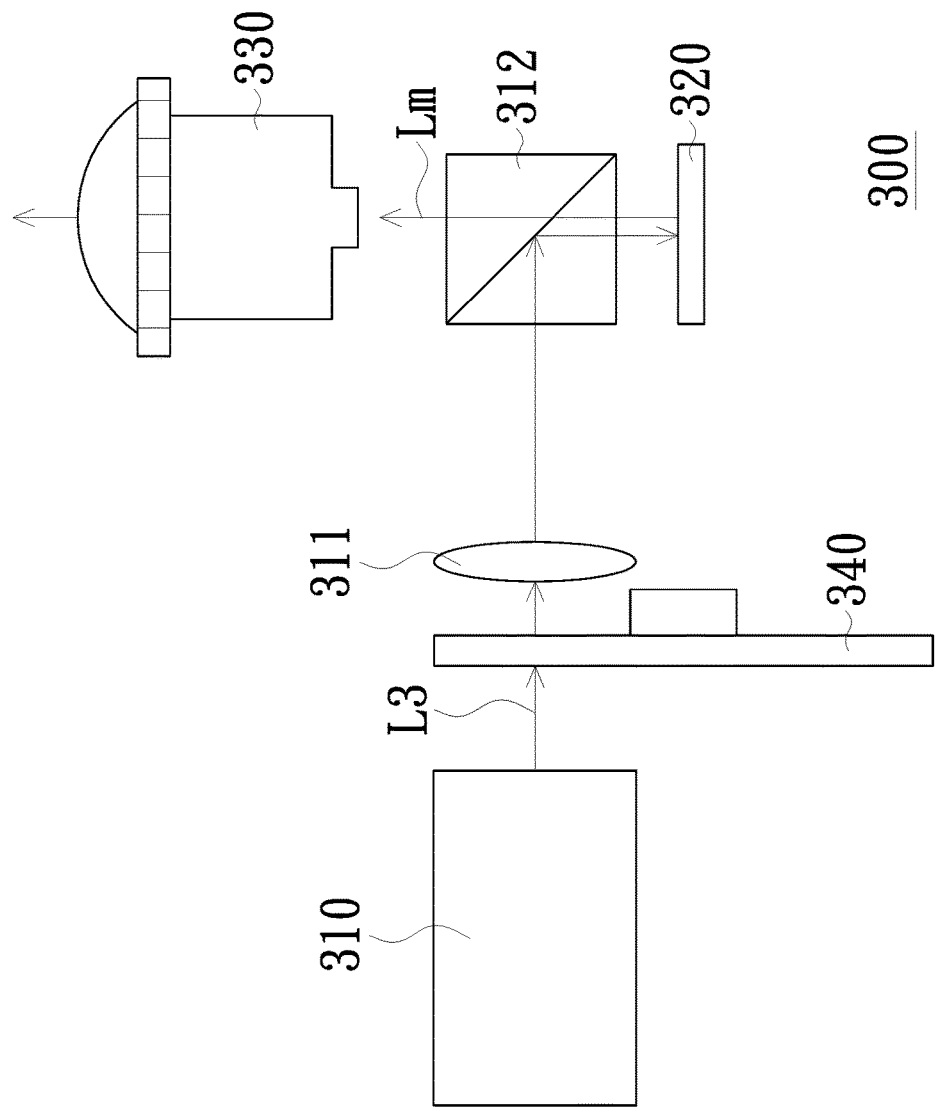
FIG. 6 is a schematic view of a projection apparatus in accordance with an embodiment of the invention.

FIG. 6 is a schematic view of a projection apparatus in accordance with an embodiment of the invention. As shown in FIG. 6, the projection apparatus 300 of the embodiment includes a light valve 320, a projection lens 330 and an illumination system 310. The illumination system 310 may be an illumination system of any of the embodiments described above, such as the illumination system 100, 100a, 100b or 100c. The light valve 320 is disposed on the transmission path of the illumination beam L3 (L1, L2) provided by the illumination system 310 to convert the illumination beam L3 into an image beam Lm. The projection lens 330 is disposed on the transmission path of the image beam Lm to project the image beam Lm onto a screen (not shown), thereby form an image on the screen.

In addition, the projection apparatus 300 of the embodiment further includes, for example, a color filter wheel 340. The color filter wheel 340 is disposed between the light valve 320 and the illumination system 310 and located on the transmission path of the illumination beam L3. By sequentially operating the color filter wheel 340, the illumination beam L3 is sequentially filtered into a plurality of sub-illumination beams of different colors, such as a red sub-illumination beam, a green sub-illumination beam and a blue sub-illumination beam. The projection apparatus 300 further includes, for example, a lens 311 disposed between the illumination system 310 and the light valve 320. The lens 311 is adapted to receive the illumination beam L3. In addition, the projection apparatus 300 further includes, for example, an internal total reflection prism 312 disposed on the transmission path of the illumination beam L3 to reflect the illumination beam L3 to the light valve 320. The light valve 320 is, for example, a reflective light valve, such as a digital micro-mirror device (DMD), for sequentially converting the plurality of above-described sub-illumination beams into a plurality of sub-image beams respectively, such as a red sub-image beam, a green sub-image beam and a blue sub-image beam. These sub-image beams pass through the internal total reflection prism 312 and are projected onto the screen via the projection lens 330. Since the projection apparatus 300 of the embodiment uses the illumination system of any of the embodiments described above, the problem of having complicated light transmission path and high cost in the projection apparatus adopting two sets of laser sources in prior art is improved, and the volume thereof can be reduced.

In addition, although the projection apparatus 300 is exemplified by having a structure adopting the internal total reflection prism 312, the invention is not limited thereto. In other embodiments, the projection apparatus may have a structure adopting a reflective element to reflect the illumination beam L3 from the color filter wheel 340 to the light valve 320 or other suitable structure. In addition, the light valve 320 may be other type of reflective light valve, such as a liquid crystal on silicon panel (LCoS panel), but the type and arrangement position of the matched optical element may need an appropriate adjustment. The color filter wheel 340 may be omitted if the light valve has a color filter. For example, the light valve 320 may be a reflective liquid crystal panel having a color filter, such as an LCoS panel having a color filter, and therefore the color filter wheel 340 may be omitted. In other embodiments, the light valve may adopt a transmissive light valve (e.g., transmissive liquid crystal panel), but the type and arrangement position of the matched optical element may need an appropriate adjustment. Since the adjustment of the type and arrangement position of the matched optical element according to the type of light valve is the general knowledge for the persons in the technical field of the art of the invention, no redundant detail is to be given herein. In addition, if the transmissive light valve has a color filter, the color filter wheel 340 may be omitted. Although the light valve 320 of the projection apparatus 300 described above is exemplified by a single light valve, however, in other embodiments, the light valve 320 may include a plurality of light valves. Hereinafter, an embodiment including a plurality of light valves will be described.

Figure 7:
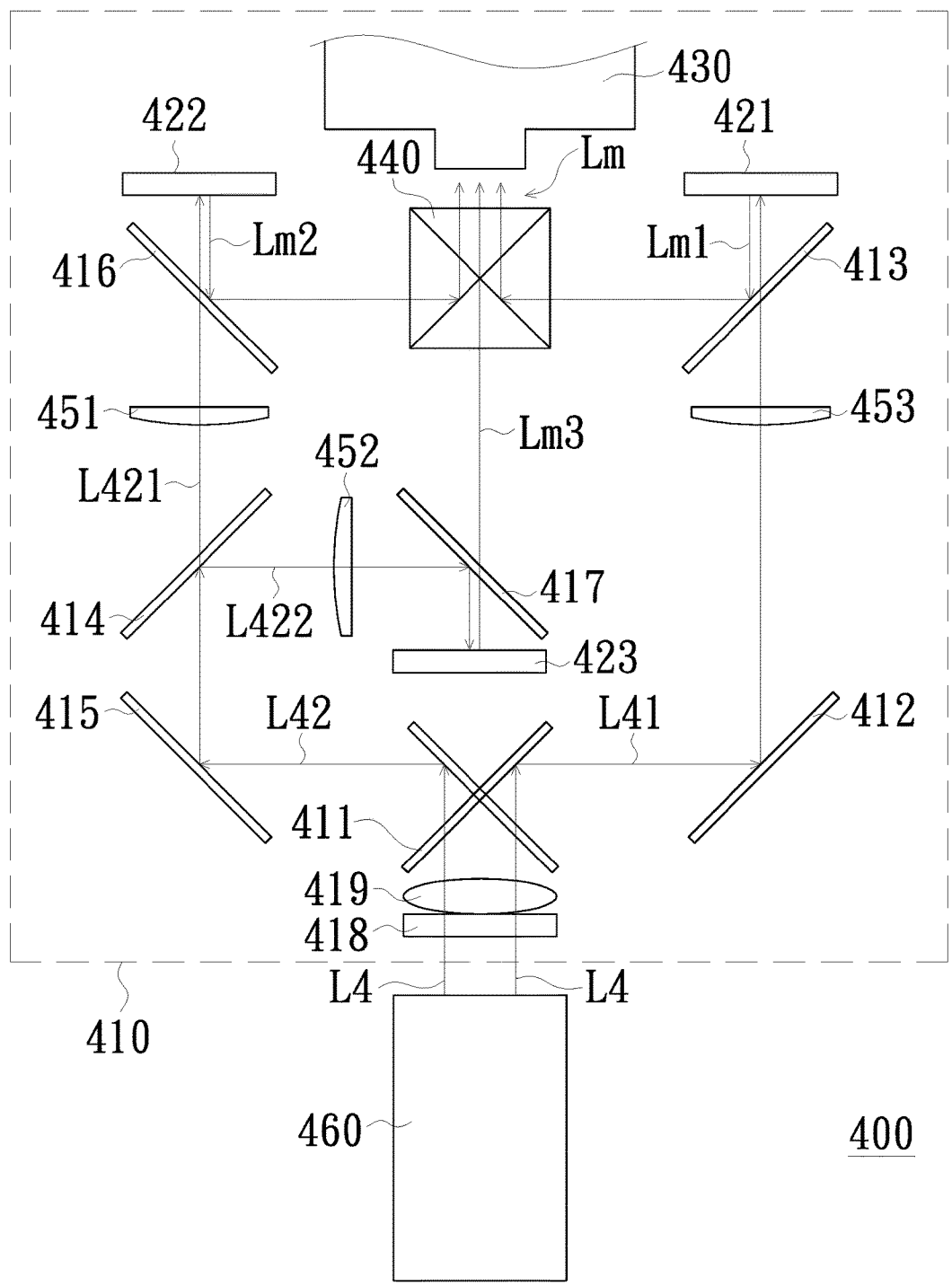
FIG. 7 is a schematic view of a projection apparatus in accordance with another embodiment of the invention.

FIG. 7 is a schematic view of a projection apparatus in accordance with another embodiment of the invention. As shown in FIG. 7, the projection apparatus 400 of the embodiment includes a beam-splitting and combiner system 410, a first light valve 421, a second light valve 422, a third light valve 423, a projection lens 430 and an illumination system 460. The illumination system 460 may be an illumination system of any of the embodiments described above, such as the illumination system 100, 100a, 100b or 100c. The beam-splitting and combiner system 410 is disposed on the transmission path of the illumination beam L4 (L1, L2) provided by the illumination system 460 to separate the illumination beam L4 into a fourth color beam L41, a fifth color beam L421 and a sixth color beam L422. The first light valve 421 is disposed on the transmission path of the fourth color beam L41 to convert the fourth color beam L41 into a first sub-image beam Lm1. The second light valve 422 is disposed on the transmission path of the fifth color beam L421 to convert the fifth color beam L421 into a second sub-image beam Lm2. The third light valve 423 is disposed on the transmission path of the sixth color beam L422 to convert the sixth color beam L422 into a third sub-image beam Lm3. The first sub-image beam Lm1, the second sub-image beam Lm2 and the third sub-image beam Lm3 are combined into the image beam Lm by the beam-splitting and combiner system 410. The projection lens 430 is disposed on the transmission path of the combined image beam Lm. All of the first light valve 421, the second light valve 422 and the third light valve 423 are transmissive light valves or are reflective light valves. The following is exemplified by a reflective liquid crystal panel, and the first light valve 421, the second light valve 422 and the third light valve 423 are, for example, LCoS panels. However, the invention does not limit the type of the reflective light valve; for example, the reflective light valve may be a DMD.

The beam-splitting and combiner system 410 of the embodiment includes, for example, an X dichroic element 411, a first reflective element 412, a first polarization beam-splitting element 413, a dichroic sheet 414, a second reflective element 415, a second polarization beam-splitting element 416, a third polarization beam-splitting element 417 and an X combiner element 440.

In the embodiment, the X dichroic element 411 is disposed on the transmission path of the illumination beam L4 to separate the illumination beam L4 into two beams which are different in color and transmitted in opposite directions. In the embodiment, the X dichroic element 411 reflects, for example, the fourth color beam L41 and a seventh color beam L42 in the illumination beam L4 in the direction opposite to each other. The fourth color beam L41 is, for example, a blue light, and the seventh color beam L42 is, for example, a yellow light. The first reflective element 412 is disposed on the transmission path of the fourth color beam L41 reflected by the X dichroic element 411, so that the fourth color beam L41 is transmitted toward the first light valve 421.

The first polarization beam-splitting element 413 is disposed between the first reflective element 412 and the first light valve 421 and is used to allow a portion of the fourth color beam L41 having a first polarization state (e.g., P-polarization state) to pass therethrough and to be transmitted to the first light valve 421. The first light valve 421 is used to convert the fourth color beam L41 having the first polarization state into the first sub-image beam Lm1 having a second polarization state (e.g., S-polarization state). The first sub-image beam Lm1 is reflected to the X combiner element 440 by the first light valve 421 and the first polarization beam-splitting element 413 sequentially.

The second reflective element 415 is disposed on the transmission path of the seventh color beam L42 reflected by the X dichroic element 411 to reflect the seventh color beam L42 to the dichroic sheet 414. The dichroic sheet 414 is disposed on the transmission path of the seventh color beam L42 reflected by the second reflective element 415 to separate the seventh color beam L42 into the fifth color beam L421 and the sixth color beam L422. The fifth color beam L421 passes through the dichroic sheet 414, and the sixth color beam L422 is reflected by the dichroic sheet 414. The fifth color beam L421 and the sixth color beam L422 each may be one of red and green light, for example, the fifth color beam L421 is a red light and the sixth color beam L422 is a green light.

The second polarization beam-splitting element 416 is disposed between the dichroic sheet 414 and the second light valve 422 and is used to allow a portion of the fifth colored beam L421 having a first polarization state (for example, P-polarization state) to pass therethrough and to be transmitted to the second light valve 422. The second light valve 422 is used to convert the fifth color beam L421 having the first polarization state into the second sub-image beam Lm2 having a second polarization state (e.g., S-polarization state). The second sub-image beam Lm2 is reflected to the X combiner element 440 by the second light valve 422 and the second polarization beam-splitting element 416 sequentially.

The third polarization beam-splitting element 417 is disposed between the dichroic sheet 414 and the third light valve 423 and is used to reflect a portion of the sixth color beam L422 having a first polarization state (for example, P-polarization state) to the third light valve 423. The third light valve 423 is used to convert the sixth color beam L422 having the first polarization state into the third sub-image beam Lm3 having a second polarization state (e.g., S-polarization state). The third sub-image beam Lm3 is reflected by the third light valve 423, passes through the third polarization beam-splitting element 417 and is transmitted to the X combiner element 440. The X combiner element 440 reflects the first sub-image beam Lm1 and the second sub-image beam Lm2 and allows the third sub-image beam Lm3 to pass therethrough, thereby combine the first sub-image beam Lm1, the second sub-image beam Lm2 and the third sub-image beam Lm3 into the image beam Lm which is transmitted toward the projection lens 430. The projection lens 430 is used to project the image beam Lm onto the screen, thereby form an image screen on the screen. Since the projection apparatus 400 of the embodiment uses the illumination system of any of the embodiments described above, the problem of having complicated light transmission path and high cost in the projection apparatus adopting two sets of laser sources in prior art is improved, and the volume thereof can be reduced.

In addition, the first polarization state and the second polarization state are represented by P-polarization state and S-polarization state as an example respectively; however, in another embodiment, the first polarization state and the second polarization state may be S-polarization State and P-polarization state respectively. In addition, the beam-splitting and combiner system 410 may further include a polarization conversion element 418 disposed between the illumination system 460 and the X dichroic element 411 to convert the polarization state of the illumination beam L4 into a first polarization state. In addition, the beam-splitting and combiner system 410 may further include a lens or other optical element, such as a lens 419 disposed between the polarization conversion element 418 and the X dichroic element 411, a lens 451 disposed between the second polarization beam-splitting element 416 and the dichroic sheet 414, a lens 452 disposed between the dichroic sheet 414 and the third polarization beam-splitting element 417, and a lens 453 disposed between the first polarization beam-splitting element 413 and the first reflective element 412. The first light valve 421, the second light valve 422 and the third light valve 423 of the embodiment are reflective light valves, but may be transmissive light valves in other embodiments. An embodiment of a plurality of sheets of transmissive light valves will be described below.

Figure 8:
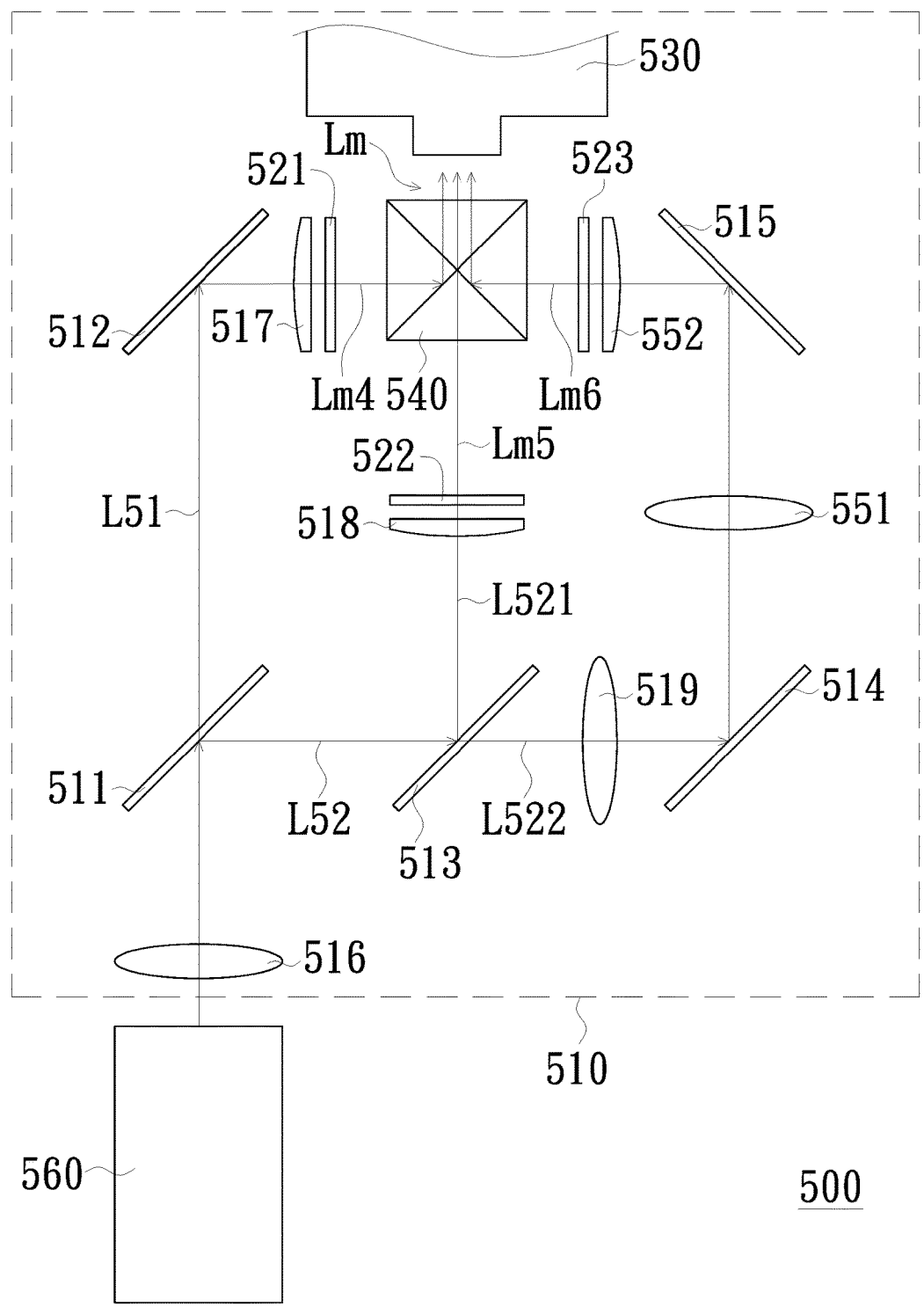
FIG. 8 is a schematic view of a projection apparatus in accordance with another embodiment of the invention.

FIG. 8 is a schematic view of a projection apparatus in accordance with another embodiment of the invention. As shown in FIG. 8, the projection apparatus 500 of the embodiment includes a beam-splitting and combiner system 510, a first light valve 521, a second light valve 522, a third light valve 523, a projection lens 530 and an illumination system 560. All of the first light valve 521, the second light valve 522 and the third light valve 523 are transmissive liquid crystal panels. The illumination system 560 may be an illumination system of any of the embodiments described above, such as the illumination system 100, 100a, 100b or 100c. The beam-splitting and combiner system 510 is used to separate the illumination beam L5 (L1, L2) provided by the illumination system 560 into a fourth color beam L51, a fifth color beam L521 and a sixth color beam L522. The fourth color beam L51, the fifth color beam L521 and the sixth color beam L522 are converted into the image beam Lm by the first light valve 521, the second light valve 522 and the third light valve 523 respectively. The beam-splitting and combiner system 510 further includes, for example, an X combiner element 540 disposed between the first light valve 521, the second light valve 522 and the third light valve 523.

In the embodiment, the beam-splitting and combiner system 510 further includes, for example, a first dichroic sheet 511, a first reflective element 512, a second dichroic sheet 513, a second reflective element 514 and a third reflective element 515. The operation way of the projection apparatus 500 will be described below by taking the illumination beam L5 being a white light as an example. The first dichroic sheet 511 is disposed on the transmission path of the illumination beam L5 from the illumination system 560 to separate the illumination beam L5 into the fourth color beam L51 and the seventh color beam L52. The fourth color beam L51 passes through the first dichroic sheet 511 and the seventh color beam L52 is reflected by the first dichroic sheet 511. The fourth color beam L51 is, for example, a red light, and the seventh color beam L52 includes, for example, a blue light and a green light. In addition, the first reflective element 512 is disposed on the transmission path of the fourth color beam L51 to reflect the fourth color beam L51 to the first light valve 521. The first light valve 521 is used to convert the fourth color beam L51 into a first sub-image beam Lm4 which is transmitted toward the X combiner element 540.

The second dichroic sheet 513 is disposed on the transmission path of the seventh color beam L52 to separate the seventh color beam L52 into the fifth color beam L521 and the sixth color beam L522. The fifth color beam L521 is reflected to the second light valve 522 by the second dichroic sheet 513, and the sixth color beam L522 passes through the second dichroic sheet 513. The second light valve 522 is used to convert the fifth color beam L521 into a second sub-image beam Lm5 which is transmitted toward the X combiner element 540.

The second reflective element 514 is disposed on the transmission path of the sixth color beam L522 to reflect the sixth color beam L522. The third reflective element 515 is disposed between the second reflective element 514 and the third light valve 523 to reflect the sixth color beam L522 to the third light valve 523. The third light valve 523 is used to convert the sixth color beam L522 into a third sub-image beam Lm6 which is transmitted toward the X combiner element 540. The X combiner element 540 reflects the first sub-image beam Lm4 and the third sub-image beam Lm6 and allows the second sub-image beam Lm5 to pass therethrough, thereby combine the first sub-image beam Lm4, the second sub-image beam Lm5 and the third sub-image beam Lm6 into the image beam Lm which is transmitted toward the projection lens 530. The projection lens 530 is used to project the image beam Lm onto the screen, thereby form an image screen on the screen. Since the projection apparatus 500 of the embodiment uses the illumination system of any of the embodiments described above, the problem of having complicated light transmission path and high cost in the projection apparatus adopting two sets of laser sources in prior art is improved, and the volume thereof can be reduced.

In addition, the beam-splitting and combiner system 510 may further include a lens or other optical element, such as a lens 516 disposed between the illumination system 560 and the first dichroic sheet 511, a lens 517 disposed between the first light valve 521 and the first reflective element 512, a lens 518 disposed between the second light valve 522 and the second dichroic sheet 513, a lens 519 disposed between the second reflective element 514 and the second dichroic sheet 513, a lens 551 disposed between the reflective element 514 and the third reflective element 515, and a lens 552 disposed between the third reflective element 515 and the third light valve 523. The lenses described above may be omitted or replaced with other suitable optical elements depending on the design requirements.

The illumination system according to the embodiment of the invention separates a first color beam provided by a first light source (laser source) into a first sub-beam and a second sub-beam by a first beam-splitting element. The first sub-beam is converted into a second color beam by an optical wavelength converting element. The second color beam is reflected toward the first beam-splitting element, and is combined with the second sub-beam, therefore, only a set of blue laser light sources is needed to generate the first color beam and the second color beam transmitted to the light valve. Compared with the prior art, the illumination system of the embodiment of the invention can reduce the cost and volume by reducing the total number of laser sources. In addition, a second beam-splitting element may include a moving member, which may rotate or vibrate to reduce speckles. In addition, since the projection apparatus of the embodiment of the invention adopts the illumination system, the problem of having complicated light transmission path and high cost in the projection apparatus adopting two sets of blue light laser sources in prior art is improved, and the volume thereof can be reduced. In addition, since the first light source (blue laser light source) and the second light source (red laser light source) share the second beam-splitting element, the volume is reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system, comprising:
a first light source, wherein the first light source is a laser light source and adapted to provide a first color beam;
a first beam-splitting element, disposed on a transmission path of the first color beam and used to separate the first color beam into a first sub-beam and a second sub-beam, wherein a portion of the first color beam transmitted to an optical wavelength converting element via the first beam-splitting element forms the first sub-beam, and the other portion of the first color beam transmitted to a second beam-splitting element via the first beam-splitting element forms the second sub-beam;

the optical wavelength converting element, disposed on a transmission path of the first sub-beam and used to convert the first sub-beam into a second color beam and reflect the second color beam back to the first beam-splitting element;

a second light source, adapted to provide a third color beam, and the second beam-splitting element, disposed on a transmission path of the second sub-beam and located between the second light source and the first beam-splitting element, wherein the second sub-beam of the first color beam is reflected back to the first beam-splitting element by the second beam-splitting element, wherein the third color beam passes through the second beam-splitting element and is transmitted to the first beam-splitting element, wherein the second sub-beam of the first color beam, the second color beam and the third color beam are combined into an illumination beam by the first beam-splitting element.

2. The illumination system according to claim 1, wherein a first portion of the first color beam passes through the first beam-splitting element to form the first sub-beam transmitted to the optical wavelength conversion element, a second portion of the first color beam is reflected by the first beam-splitting element to form the second sub-beam transmitted to the second beam-splitting element, a first portion of the second sub-beam reflected back to the first beam-splitting element by the second beam-splitting element passes through the first beam-splitting element, the third color beam passes through the first beam-splitting element, wherein the second color beam reflected by the first beam-splitting element, the third beam passing through the first beam-splitting element and the first portion of the second sub-beam passing through the first beam-splitting element are combined into the illumination beam.

3. The illumination system according to claim 2, wherein the first beam-splitting element comprises:
   a substrate;
   a first beam-splitting layer, disposed on the substrate, and the first beam-splitting layer used to reflect the second portion of the first color beam to form the second sub-beam and allow the third color beam to pass therethrough; and
   a second beam-splitting layer, disposed on the substrate, and the second beam-splitting layer used to allow the first portion of the first color beam to pass therethrough to form the first sub-beam, reflect the second color beam, and allow the second sub-beam and the third color beam transmitted from the second beam-splitting element to pass therethrough, wherein a coverage area of the first beam-splitting layer on the substrate is smaller than a coverage area of the second beam-splitting layer on the substrate.

4. The illumination system according to claim 3, wherein the coverage area of the first beam-splitting layer on the substrate is 5% to 20% of the coverage area of the second beam-splitting layer on the substrate.

5. The illumination system according to claim 2, wherein the first beam-splitting element comprises:
   a substrate, having a first surface and a second surface opposite to the first surface;
   a first beam-splitting layer, disposed on the first surface and located between the substrate and the first light source, wherein the first beam-splitting layer is used to allow the first portion of the first color beam to pass therethrough to form the first sub-beam and reflect the second portion of the first color beam to form the second sub-beam; and
   a second beam-splitting layer, disposed on the second surface, and the second beam-splitting layer used to allow the first sub-beam and the third color beam to pass therethrough and reflect the second color beam.

6. The illumination system according to claim 5, wherein a reflectance and a transmittance of the first beam-splitting layer to the first color beam are X % and Y % respectively, wherein X is between 10-30, Y is between 90-70, and X+Y is smaller than or equal to 100.

7. The illumination system according to claim 1, wherein a first portion of the first color beam is reflected by the first beam-splitting element to form the first sub-beam transmitted to the optical wavelength conversion element, a second portion of the first color beam passes through the first beam-splitting element to form the second sub-beam transmitted to the second beam-splitting element, a first portion of the second sub-beam reflected back to the first beam-splitting element by the second beam-splitting element is reflected by the first beam-splitting element, and the third color beam is reflected by the first beam-splitting element, wherein the second color beam passing through the first beam-splitting element, the third color beam reflected by the first beam-splitting element and the first portion of the second sub-beam reflected by the first beam-splitting element are combined into the illumination beam.

8. The illumination system according to claim 7, wherein the first beam-splitting element comprises:
   a substrate, comprising a through-hole, wherein the through-hole is used to allow the second portion of the first color beam to pass therethrough to form the second sub-beam;
   a first beam-splitting layer, disposed on the substrate and used to reflect the first portion of the first color beam to form the first sub-beam and allow the second color beam to pass therethrough; and
   a second beam-splitting layer, disposed on the substrate, and the second beam-splitting layer used to allow the second color beam to pass therethrough and reflect the third color beam and the second sub-beam reflected by the second beam-splitting element, wherein an area of the through-hole in the substrate is smaller than a coverage area of the first or second beam-splitting layer on the substrate.

9. The illumination system according to claim 8, wherein an area of the through-hole in the substrate is 5% -20% of a coverage area of the first or second beam-splitting layer on the substrate.

10. The light source module according to claim 7, wherein the first beam-splitting element comprises:
   a substrate, having a first surface and a second surface opposite to the first surface;
   a first beam-splitting layer, disposed on first surface and located between the substrate and the first light source, wherein the first beam-splitting layer is used to reflect the first portion of the first color beam to form the first sub-beam and allow the second portion of the first color beam to pass therethrough to form the second sub-beam; and
   a second beam-splitting layer, disposed on the second surface, and the second beam-splitting layer used to allow the second sub-beam and the second color beam to pass therethrough and reflect the third color beam.

11. The illumination system according to claim 10, wherein a reflectance and a transmittance of the first beam-splitting layer to the first color beam are X % and Y % respectively, wherein X is between 90-70, Y is between 10-30, and X+Y is smaller than or equal to 100.

12. The illumination system according to claim 1, wherein the second beam-splitting element comprises:
a diffusion layer; and
a third beam-splitting layer,
wherein the diffusion layer is located between the third beam-splitting layer and the first beam-splitting element, the second sub-beam passes through the diffusion layer and then is reflected back to the first beam-splitting element by the third beam-splitting layer, and the third color beam sequentially passes through the third beam-splitting layer and the diffusion layer and is transmitted to the first beam-splitting element.

13. The illumination system according to claim 1, wherein the first color beam is a blue beam, the second color beam is a yellow beam or a green beam, and the third color beam is a red beam.

14. The illumination system of claim 1, wherein the optical wavelength conversion element is a phosphor color wheel.

15. The illumination system according to claim 12, wherein the second beam-splitting element further comprises a moving member, the diffusion layer is connected to the moving member, the third beam-splitting layer is disposed on a surface of the diffusion layer facing the second light source, and the moving member is adapted to rotate or vibrate.

16. The illumination system of claim 1, wherein the second light source is a light emitting diode light source or a laser light source.

17. The illumination system according to claim 1, further comprising a light integration rod disposed on a transmission path of the illumination beam.

18. A projection apparatus, comprising:
the illumination system claimed in claim 1;
a beam-splitting and combiner system, disposed on a transmission path of the illumination beam provided by the illumination system and used to separate the illumination beam into a fourth color beam, a fifth color beam and a sixth color beam;
a first light valve, disposed on a transmission path of the fourth color beam and used to convert the fourth color beam into a first sub-image beam;
a second light valve, disposed on a transmission path of the fifth color beam and used to convert the fifth color beam into a second sub-image beam;
a third light valve, disposed on a transmission path of the sixth color beam and used to convert the sixth color beam into a third sub-image beam, wherein the first sub-image beam, the second sub-image beam and the third sub-image beam are combined into an image beam by the beam-splitting and combiner system; and
a projection lens, disposed on a transmission path of the combined image beam and used to project the combined image beam.

19. A projection apparatus, comprising:
the illumination system claimed in claim 1;
a light valve, disposed on a transmission path of the illumination beam provided by the illumination system and used to convert the illumination beam into an image beam; and
a projection lens, disposed on a transmission path of the image beam and used to project the image beam.

* * * * *